United States Patent Office 3,235,564
Patented Feb. 15, 1966

3,235,564
INTERMEDIATES TO CERTAIN SULFUR-CONTAINING ORTHO-FUSED POLYCYCLIC PYRAZOLE DERIVATIVES
Hans A. Wagner, Skokie, Ill., assignor to G. D. Searle & Co., Chicago, Ill., a corporation of Delaware
No Drawing. Filed Mar. 27, 1964, Ser. No. 355,412
3 Claims. (Cl. 260—327)

The application for Letters Patent securing the invention herein disclosed and claimed is a continuation-in-part of applicant's prior copending application Serial No. 202,372, filed June 14, 1962, now having matured to U.S. Patent No. 3,158,619.

This invention relates to certain sulfur-containing ortho-fused polycyclic pyrazole derivatives, intermediates thereto, and processes for the preparation thereof. More particularly, this invention provides novel, biologically useful compounds of the formula

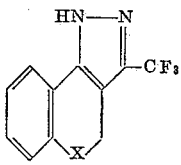

and of the formula

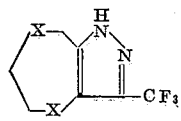

wherein X represents either divalent sulfur or a sulfonyl radical.

The above-enformulated pyrazoles, and likewise the intermediates thereto herein disclosed and claimed, are useful by reason of their valuable pharmacological properties. Thus, for example, they are anti-bacterial agents especially effective against *Escherichia coli* and *Diplococcus pneumoniae*, in addition to which specifically 1,4-dihydro-3-trifluoromethyl-1-benzothiopyrano[4,3 - c]pyrazole 5,5-dioxide, the product of Example 2 hereinafter, depresses the central nervous system and blocks the effect of desoxycorticosterone acetate on urinary sodium and potassium. Further, the intermediates inhibit the growth of *Tricophyton mentagrophytes* and *Candida albicans*, impede cotyledenous seed germination, and counteract the formation of edema associated with the inflammatory response to tissue injury.

Preparation of the subject compounds proceeds by contacting 4-thiachromanone in hot benzene or 1,4-dithiepan-6-one in ether, under the influence of an alkaline catalyst such as sodium methoxide, with ethyl trifluoroacetate to produce the intermediate dione

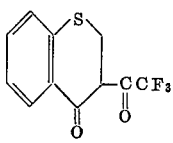

or

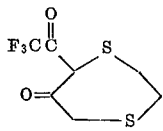

which, upon heating with hydrazine hydrate in acid alcoholic medium, is cyclized to the corresponding pyrazole

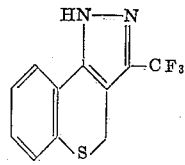

or

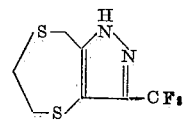

respectively. Oxidation of the latter two compounds with peracetic acid in acetic acid affords the instant sulfonyl derivatives.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *2-trifluoroacetyl-4-thiachromanone.*—To a suspension of 29 parts of sodium methoxide in 450 parts of benzene is slowly added—with agitation—71 parts of ethyl trifluoroacetate, followed—during 15 minutes—by a solution of 82 parts of 4-thiachromanone in 450 parts of benzene. The resultant mixture is heated at the boiling point under reflux with agitation for 2 hours, then maintained with agitation at room temperatures overnight. A solution of 34 parts of glacial acetic acid in 150 parts of water is thereupon stirred in, followed by a solution of 66 parts of cupric acetate in 500 parts of water. Stirring is continued for 20 minutes longer, at which point the benzene is removed by vacuum distillation. Insoluble solids (the copper chelate of the desired β-diketone) are removed from the distilland by filtration, washed on the filter with water, and subjected to steam distillation. When the distillate comes over free of oily starting materials—typically, after around 3000 parts of aqueous distillate have been collected—32 parts of concentrated sulfuric acid is added thereto and steam distillation is resumed until a second 3000 parts of aqueous distillate has been collected. From the distilland thus obtained—on cooling—a solid precipitates, which is filtered off and extracted into dichloromethane. The filtrate is likewise extracted with dichloromethane, whereupon the extracts are combined, dried over anhydrous sodium sulfate, and stripped of solvent by distillation. The residue, recrystallized from pentane, affords 2-trifluoroacetyl-4-thiachromanone melting at approximately 78–79°.

B. *1,4 - dihydro - 3 - trifluoromethyl - 1 - benzothiopyrano[4,3-c]pyrazole.*—A solution of 130 parts of 2-trifluoroacetyl - 4 - thiachromanone, 27 parts of hydrazine hydrate, and 30 parts of glacial acetic acid in 1200 parts of 95% ethanol is heated at the boiling point under reflux for 3 hours, then concentrated to ⅓ of its original volume by distillation. To the boiling concentrate is added just sufficient water to bring about incipient cloudiness. From the resultant mixture, on cooling there crystallizes 1,4 - dihydro-3-trifluoromethyl-1-benzothiopyrano-

[4,3-c]-pyrazole which, recrystallized from a mixture of methanol and water, melts at approximately 146–147°. The product has the formula

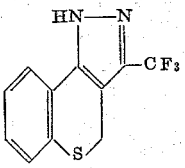

EXAMPLE 2

*1,4-dihydro-3-trifluoromethyl-1-benzothiopyrano[4,3-c]-pyrazole 5,5-dioxide.*—To a solution of 50 parts of 1,4-dihydro - 3 - trifluoromethyl - 1-benzothiopyrano-[4,3-c]-pyrazole in 300 parts of glacial acetic acid is added, with agitation at a rate such that temperatures are in the range 50–60°, 68 parts of a 40% solution of peracetic acid in acetic acid. The resultant mixture is allowed to stand at room temperatures overnight, then poured into 5000 parts of water. The precipitate which forms is filtered off; consecutively washed on the filter with water, aqueous sodium bicarbonate, and water; and recrystallized from ethanol to give 1,4-dihydro-3-trifluoromethyl-1-benzothiopyrano[4,3-c]pyrazole 5,5-dioxide melting at approximately 222–223°. The product has the formula

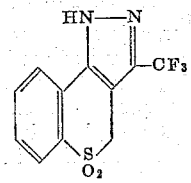

EXAMPLE 3

A. *7-trifluoroacetyl-1,4-dithiepan-6-one.*—To a suspension of 18 parts of sodium methoxide in 300 parts of ether is added, with agitation, 42 parts of methyl trifluoroacetate followed by a solution of 44 parts of 1,4-dithiepan-6-one in 100 parts of ether. The resultant mixture is maintained with agitation for 6 hours at room temperatures, whereupon agitation is discontinued and the mixture allowed to stand at room temperatures overnight. Approximately 400 parts of water is then mixed in; the ether phase is separated; the aqueous phase is extracted with ether; and the two ether solutions are combined, filtered through diatomaceous earth, and acidified with glacial acetic acid. The precipitate which forms is filtered off, washed on the filter with water, and recrystallized from pentane to give 7-trifluoroacetyl-1,4-dithiepan-6-one melting at approximately 66–67°.

B. *1,5,6,8 - tetrahydro-3-trifluoromethyl-1,4-dithiepino-[3,2-c]pyrazole.*—A solution of 183 parts of 7-trifluoroacetyl-1,4-dithienpan-6-one, 47 parts of hydrazine hydrate, and 45 parts of glacial acetic acid in 1500 parts of 95% ethanol is heated at the boiling point under reflux overnight, then concentrated to ⅓ of its original volume by distillation. To the hot concentrate, sufficient water is added to induce incipient turbidity. From the resultant mixture, on cooling, a crystalline precipitate is thrown down which, filtered off and recrystallized from a mixture of methanol and water, melts at approximately 187°. This material is 1,5,6,8-tetrahydro-3-trifluoromethyl-1,4-dithiepino[3,2-c]pyrazole, having the formula

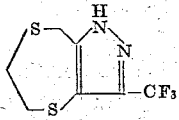

EXAMPLE 4

*1,5,6,8 - tetrahydro - 3 - trifluoromethyl-1,4-dithiepino-[3,2-c]pyrazole 4,4,7,7-tetroxide.*—To a solution of 96 parts of 1,5,6,8 - tetrahydro - 3-trifluoromethyl-1,4-dithiepino[3,2-c]pyrazole in 400 parts of glacial acetic acid is added, during 20 minutes and at temperatures in the range 60–65°, 310 parts of a 40% solution of peracetic acid in acetic acid. The resultant mixture is allowed to stand overnight, then poured into 5000 parts of water. The precipitate which forms is filtered off; consecutively washed on the filter with water, aqueous sodium bicarbonate, and water; and dried at 80° in vacuo. The material thus isolated melts above 300°. It is 1,5,6,8-tetrahydro - 3 - trifluoromethyl - 1,4-dithiepino[3,2-c]pyrazole 4,4,7,7-tetroxide, of the formula

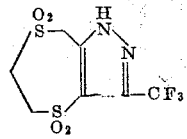

What is claimed is:
1. A compound selected from the group consisting of a compound of the formula

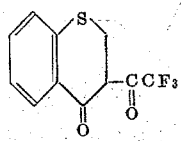

and a compound of the formula

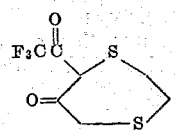

2. 2-trifluoroacetyl-4-thiachromanone.
3. 7-trifluoroacetyl-1,4-dithiepan-6-one.

References Cited by the Examiner
UNITED STATES PATENTS 2,923,716    2/1960    Bossert _____ 260—327

WALTER A. MODANCE, *Primary Examiner.*